(12) United States Patent
Muto et al.

(10) Patent No.: US 11,755,876 B2
(45) Date of Patent: Sep. 12, 2023

(54) INTERFERENCE SUPPRESSION APPARATUS AND INTERFERENCE SUPPRESSION SYSTEM

(71) Applicant: DENSO WAVE INCORPORATED, Aichi-Pref. (JP)

(72) Inventors: Eiji Muto, Chita-gun (JP); Kohei Enomoto, Chita-gun (JP); Yusuke Masuda, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 64 days.

(21) Appl. No.: 17/349,172

(22) Filed: Jun. 16, 2021

(65) Prior Publication Data

US 2021/0390362 A1 Dec. 16, 2021

(30) Foreign Application Priority Data

Jun. 16, 2020 (JP) ................................. 2020-103618

(51) Int. Cl.
*G06K 19/06* (2006.01)
*G06K 19/077* (2006.01)

(52) U.S. Cl.
CPC . *G06K 19/07771* (2013.01); *G06K 19/07773* (2013.01)

(58) Field of Classification Search
CPC ....... G06K 19/07771; G06K 19/07773; G06K 19/10178; G06K 19/07; G06F 21/606; G06Q 50/10
USPC ................................................. 235/492, 487
See application file for complete search history.

(56) References Cited

U.S. PATENT DOCUMENTS

| | | | | |
|---|---|---|---|---|
| 6,975,834 B1 * | 12/2005 | Forster | ................ | H01Q 1/2225 455/279.1 |
| 7,102,520 B2 * | 9/2006 | Liu | ...................... | H01Q 1/2225 343/873 |
| 7,855,697 B2 * | 12/2010 | Chamarti | ................ | H01Q 1/38 343/895 |
| 8,238,285 B2 * | 8/2012 | Rofougaran | .......... | H03F 1/0266 375/216 |
| 8,421,626 B2 * | 4/2013 | Downie | ............ | G06K 19/0717 340/687 |
| 9,104,925 B2 * | 8/2015 | Manzi | ................ | G06K 7/10237 |
| 2006/0232419 A1 * | 10/2006 | Tomioka | .......... | G06K 19/07749 340/572.7 |

FOREIGN PATENT DOCUMENTS

| | | | | |
|---|---|---|---|---|
| JP | 2002-077164 A | | 3/2002 | |
| JP | 2006-126901 A | | 5/2006 | |
| JP | 2007-123868 A | | 5/2007 | |
| JP | 2008-124939 A | | 5/2008 | |
| JP | 2011071606 | * | 7/2011 | ............. G06K 17/00 |

* cited by examiner

*Primary Examiner* — Daniel St. Cyr
(74) *Attorney, Agent, or Firm* — Oliff PLC

(57) ABSTRACT

An interference suppression apparatus suppresses electromagnetic field interference produced by an RFID tag. The interference suppression apparatus includes a power supply circuit, an antenna that is connected to the power supply circuit, a clock that is connected to the power supply circuit, and a load adjuster that is connected to the power supply circuit. The clock generates an output in which a time constant is adjusted to be longer than a communication time of the RFID tag. The load adjuster changes a characteristic of the antenna based on the output from the clock.

8 Claims, 11 Drawing Sheets

OPEN

SHORT CIRCUIT

TAG COMMUNICATION TIME (T1)

TIME

FIG.6

```
         START
           │
S12 ── RECEIVE SIGNAL
           │
S14 ── CONTROL LOAD STATE
           │
          END
```

FIG.7

| 1 0 (1) | 1 0 (2) | DIRECTIVITY |
|---------|---------|-------------|
| ON | ON | NARROW DIRECTIVITY |
| ON | OFF | DIRECTIVITY |
| OFF | OFF | NON-DIRECTIONAL |
| OFF | ON | DIRECTIVITY |

INTERFERENCE SUPPRESSION APPARATUS AND INTERFERENCE SUPPRESSION SYSTEM

CROSS-REFERENCE TO RELATED APPLICATIONS

This application is based on and claims the benefit of priority from Japanese Patent Application No. 2020-103618, filed on Jun. 16, 2020. The entire disclosure of the above application is incorporated herein by reference.

BACKGROUND

Technical Field

The present disclosure relates to an interference suppression apparatus that suppresses electromagnetic field interference produced by a Radio Frequency IDentification (RFID) tag, and an interference suppression system in which the interference suppression apparatus is used.

Related Art

A passive-type RFID system that enables long-distance reading and does not require a power supply is used as a means for item inventory management and traceability across supply chains. The passive-type RFID system has a fundamental issue in that a location (a multipath interference point or a null point) at which the RFID tag becomes spatially difficult to read due to radio interference from a nearby electromagnetic-wave reflecting body is present.

SUMMARY

One aspect of the disclosure provides an interference suppression apparatus that suppresses electromagnetic field interference produced by an RFID tag. The interference suppression apparatus includes: a power supply circuit; an antenna that is connected to the power supply circuit; a clock that is connected to the power supply circuit; and a load adjuster that is connected to the power supply circuit. The clock generates an output in which a time constant is adjusted to be longer than a communication time of the RFID tag. The load adjuster changes a characteristic of the antenna based on the output from the clock.

BRIEF DESCRIPTION OF THE DRAWINGS

In the accompanying drawings:

FIG. 6 is a flowchart of operations of the interference suppression apparatus according to the first embodiment;

FIG. 7 is a diagram of changes in antenna directivity in the interference suppression apparatus shown in FIG. 2B;

DESCRIPTION OF THE EMBODIMENTS

Figure 1A:
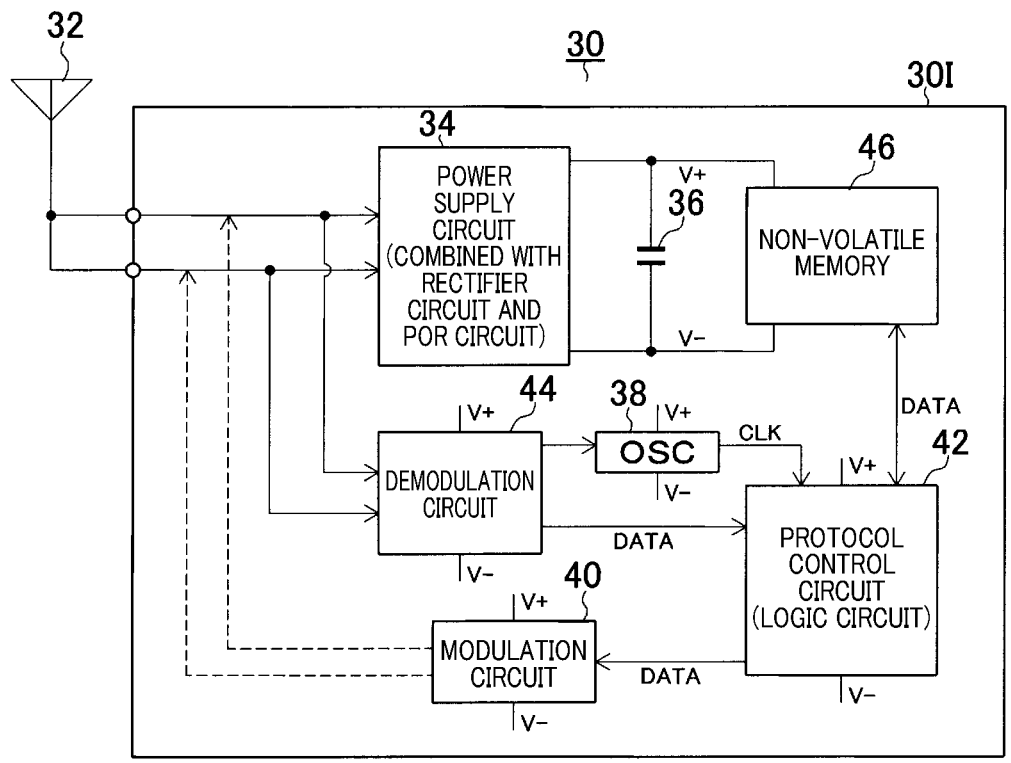
FIG. 1A is a circuit diagram of an RFID tag IC that configures an RFID tag according to a first embodiment.

In JP-A-2002-077164, a radio wave relay (stirrer) is used to pass radio waves between a transmission terminal and a reception terminal. In JP-A-2008-124939, a radio wave path is changed by a reflective plate that is mechanically controlled, thereby reducing effects of multipath.

It is thus desired to provide an interference suppression apparatus that is capable of resolving difficulty in reading an RFID tag due to electromagnetic field interference, and an interference suppression system.

A first disclosure provides an interference suppression apparatus that suppresses electromagnetic field interference produced by an RFID tag. The interference suppression apparatus includes: a power supply circuit; an antenna that is connected to the power supply circuit; a clock that is connected to the power supply circuit and generates an output in which a time constant is adjusted to be longer than a communication time of the RFID tag; and a load adjuster that is connected to the power supply circuit and changes a characteristic of the antenna based on the output from the clock.

According to the first disclosure, the clock generates an output in which the time constant is adjusted to be longer than the communication time of the RFID tag. The load adjuster changes the characteristic of the antenna based on the output from the clock. Consequently, as a result of an electromagnetic field at an antenna of the RFID tag being changed at a period that is longer than the communication time of the RFID tag, electromagnetic field interference produced by the RFID tag can be suppressed and difficulty in reading the RFID tag due to electromagnetic field interference can be resolved.

A second disclosure provides an interference suppression apparatus that suppresses electromagnetic field interference produced by an RFID tag. The interference suppression apparatus includes: a power supply circuit; an antenna that is connected to the power supply circuit; a command detector that is connected to the power supply circuit and detects a specific command that is transmitted from an RFID reading apparatus RFID tags; and a load adjuster that is connected to the power supply circuit and changes a characteristic of the antenna based on the specific command detected by the command detector.

According to the second disclosure, the load adjuster changes the characteristic of the antenna based on the detection of a specific command by the command detector that detects a specific command (such as a command for responding to a collision) that is transmitted from the RFID reading apparatus. Consequently, as a result of the electromagnetic field at an antenna of the RFID tag being changed at a timing at which the specific command is outputted, electromagnetic field interference produced by the RFID tag can be suppressed and difficulty in reading the RFID tag due to electromagnetic field interference can be resolved.

According to a third disclosure, the power supply circuit may generate electric power from electromagnetic waves from the RFID reading apparatus for RFID tags. As a result, the interference suppression apparatus can be applied to a passive-type RFID system in which power supply is not required.

According to a fourth disclosure, the interference suppression apparatus may be provided on a same label as the RFID tag. In addition, the antenna of the interference suppression apparatus and the antenna of RFID tag may be arranged so as to be substantially parallel to each other with a predetermined gap therebetween. Consequently, as a result of the electromagnetic field being effectively changed in relation to the antenna of the RFID tag by the antenna of the interference suppression apparatus that is arranged so as to be substantially parallel to the antenna of the RFID tag with a predetermined gap therebetween, electromagnetic field interference produced by the RFID tag can be suppressed and difficulty in reading the RFID tag due to electromagnetic field interference can be resolved.

According to a fifth disclosure, the interference suppression apparatus may be mounted in the RFID tag. Consequently, as a result of the electromagnetic field being effectively changed in relation to the antenna of the RFID tag, electromagnetic field interference can be suppressed and difficulty in reading the RFID tag due to electromagnetic field interference can be resolved.

According to a sixth disclosure, the clock may be configured by a timer. As a result, an operation period can be accurately set.

According to a seventh disclosure, the antenna may be configured by a dipole antenna that includes two elements. The load adjuster may change the characteristic of the antenna by setting a state between the two elements to an open state, a short-circuit state, or a terminal state other than the open state and the short-circuit state. As a result, the electromagnetic field can be effectively changed in relation to the antenna of the RFID tag.

According to an eighth disclosure, the antenna may have a single element and a grounding surface. The load adjuster may change the characteristic of the antenna by setting a state between the single element and the grounding surface to an open state, a short-circuit state, or a terminal state other than the open state and the short-circuit state. As a result, the electromagnetic field can be effectively changed in relation to the antenna of the RFID tag even when the RFID tag is attached to metal, by a metal surface serving as the grounding surface.

According to a ninth disclosure, the antenna of the interference suppression apparatus according to the eight disclosure may be either of a monopole antenna and an L-shaped antenna. As a result, the electromagnetic field can be effectively changed in relation to the antenna of the RFID tag even when the RFID tag is attached to metal, by a metal surface serving as the grounding surface.

According to a tenth disclosure, the antenna may be configured by a resonator. The load adjuster may change the characteristic of the antenna by changing behavior of the resonator as an electrical wall, an electromagnetic wall, or an electromagnetic band gap structure. Consequently, as a result of the electromagnetic field being effectively changed in relation to the antenna of the RFID tag, electromagnetic field interference produced by the RFID tag can be suppressed and difficulty in reading the RFID tag due to electromagnetic field interference can be resolved.

According to an eleventh disclosure, the antenna of the interference suppression apparatus according to the tenth disclosure may have either of a mushroom structure and a composite right/left-hand line. Consequently, as a result of the electromagnetic field being effectively changed in relation to the antenna of the RFID tag, electromagnetic field interference produced by the RFID tag can be suppressed and difficulty in reading the RFID tag due to electromagnetic field interference can be resolved.

According to a twelfth disclosure, the antenna of the interference suppression apparatus may be arranged so as to have an angle in relation to a horizontal surface or a vertical surface, and changes electromagnetic field interference produced by the radio frequency identification tag in a three-dimensional manner. Consequently, as a result of the electromagnetic field being changed in a three-dimensional manner in relation to the antenna of the RFID tag, electromagnetic field interference produced by the RFID tag can be suppressed and difficulty in reading the RFID tag due to electromagnetic field interference can be resolved.

According to a thirteenth disclosure, a pair of first and second interference suppression apparatuses may be provided on a same label as the RFID tag. The antenna of the first interference suppression apparatus and the antenna of the second interference suppression apparatus may be arranged so as to sandwich the antenna of the RFID tag. The label may be attached to a three dimensional object such that the antenna of the RFID tag is positioned on a corner between a first surface and a second surface that form a right angle of the three-dimensional object, the antenna of the first interference suppression apparatus is positioned on the first surface, and the antenna of the second interference suppression apparatus is positioned on the second surface. Consequently, as a result of the electromagnetic field being changed (polarized) in a vertical direction or a horizontal direction in relation to the antenna of the RFID tag, electromagnetic field interference produced by the RFID tag can be suppressed and difficulty in reading the RFID tag due to electromagnetic field interference can be resolved.

A fourteenth disclosure provides an interference suppression system that has a plurality of interference suppression apparatuses. The plurality of the interference suppression apparatuses may be the interference suppression apparatus according to the first disclosure. The plurality of interference suppression apparatuses may change the characteristics of the respective antennas at differing timings, by changing the time constants of the respective clocks of the plurality of interference suppression apparatuses within a predetermined range. Consequently, as a result of the plurality of interference suppression apparatuses changing the characteristics of the antennas at differing timings, thereby interfering with each other and changing the electromagnetic field in a complex manner, electromagnetic field interference produced by the RFID tag can be suppressed and difficulty in reading the RFID tag due to electromagnetic field interference can be resolved.

First Embodiment

An interference suppression apparatus according to a first embodiment will hereinafter be described with reference to the drawings.

FIG. 1A shows an electrical configuration of an RFID tag 30 that is to be read by an RFID reading apparatus (an RFID reader or a wireless tag reader) for RFID tags.

As shown in FIG. 1A, the RFID tag 30 is configured by an RFID tag integrated circuit (IC) 301. The RFID tag IC 301 is configured by an antenna 32, a power supply circuit 34, a demodulation circuit 44, a protocol control circuit 42, a non-volatile memory 46, a modulation circuit 40, a capacitor 36, an oscillator 38, and the like.

For example, the power supply circuit 34 may be configured by a power supply circuit that is combined with a rectifier circuit and a Power-On Reset (POR) circuit. The power supply circuit 34 rectifies and smooths a transmission signal (carrier signal) from the RFID reading apparatus that is received through the antenna 32, and generates an operation power supply. The power supply circuit 34 stores the operation power supply in the capacitor 36 as electric charge. The power supply circuit 34 supplies each constituent element of the RFID tag IC 301 including the protocol control circuit 42 with the electric charge that is stored in the capacitor 36, the electric charge serving as a power supply voltage.

The demodulation circuit 44 demodulates data (DATA) that is superimposed on the transmission signal (carrier signal) and outputs the demodulated data to the protocol control circuit 42.

The non-volatile memory 46 is configured by various types of semiconductor memory, such as a read-only memory (ROM) and an electrically erasable programmable read-only memory (EEPROM). The non-volatile memory 46 stores therein a control program, identification information (tag identifier [ID]) for identifying the RFID tag 30 or data (DATA) based on application of the RFID tag 30, and the like.

For example, the protocol control circuit 42 may be configured by a logic circuit. The protocol control circuit 42 reads the above-described pieces of information and data from the non-volatile memory 46, and outputs the information and data to the modulation circuit 40 as transmission data (DATA).

The modulation circuit 40 performs load modulation of a response signal (carrier signal) with the transmission data (DATA) and transmits the load-modulated response signal from the antenna 32 as a response wave.

Here, FIG. 1A shows an example of an electrical configuration of the RFID tag 30. However, other publicly known electrical configurations may be used for the RFID tag 30 as long as the configuration is that which enables wireless communication to be performed by the medium of electromagnetic waves.

Figure 1B:
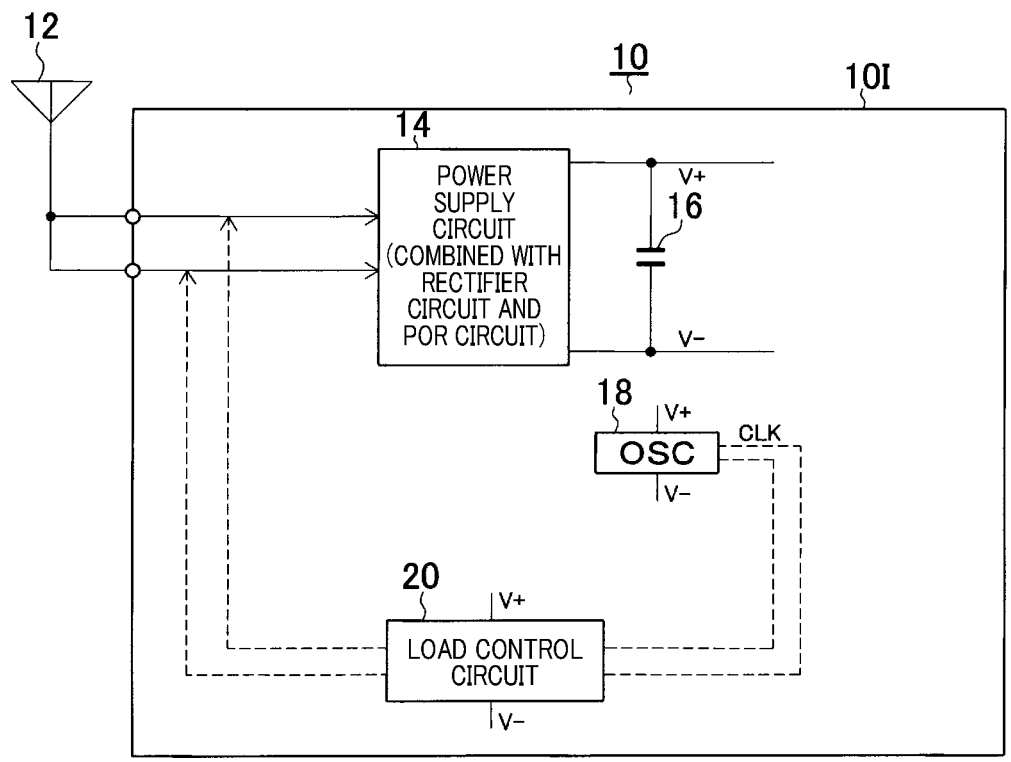
FIG. 1B is a circuit diagram of an interference suppression apparatus IC that configures an interference suppression apparatus according to a first embodiment.

FIG. 1B is a circuit diagram of an electrical configuration of an interference suppression apparatus 10 according to the first embodiment.

As shown in FIG. 1B, the interference suppression apparatus 10 is configured by an interference suppression apparatus IC 10I. The interference suppression apparatus IC 10I is configured by an antenna 12, a power supply circuit 14, a capacitor 16, an oscillator 18, a load control circuit 20, and the like. The oscillator 18 configures a clock. The load control circuit 20 that configures a load adjuster.

For example, the power supply circuit 14 may be configured by a power supply circuit that is combined with a rectifier circuit and a POR circuit. The power supply circuit 14 rectifies and smooths a transmission signal (carrier signal) from the RFID reading apparatus (not shown) that is received through the antenna 12, and generates an operation power supply. The power supply circuit 14 stores the operation power supply in the capacitor 16 as electric charge. The power supply circuit 14 supplies each constituent element of the interference suppression apparatus IC 10I including the load control circuit 20 with the electric charge that is stored in the capacitor 16, the electric charge serving as a power supply voltage.

For example, the oscillator 18 is configured by an oscillator that includes a resistor-capacitor (RC) circuit that is configured by a resistor and a capacitor, and is capable of determining a frequency of an output (CLK) having low and high levels, based on a time constant $(\tau)(\tau=R\times C$:R is a resistance value of the resistor and C is a capacitance value of the capacitor) of the RC circuit. The oscillator 18 generates the output (CLK) in which the time constant $(\tau)$ is adjusted to be longer than a communication time of the RFID tag 30. The oscillator 18 transmits the output (CLK) at a period that is set.

The oscillator 18 can also be configured by a timer that enables the period to be more accurately set.

Here, the configuration of the oscillator 18 is not limited to the foregoing. For example, any type of oscillator is applicable as long as the oscillator controls the load control circuit 20 at a timing that is within a range in which communication of the RFID tag 30 is not interrupted. That is, for example, a crystal oscillator that combines a crystal resonator and a frequency divider, or a crystal oscillator that uses a crystal resonator that is designed to resonate at a desired frequency through selection of electrodes, polarization direction, and cut surface is applicable.

Here, the following methods can be provided as specific examples of a method for controlling the load control circuit 20 at a timing that is within a range in which communication of the RFID tag 30 is not interrupted. That is, for example, the method may be that in which load switching is performed over a time span that is longer than an amount of time that is required for a single RFID tag 30 to complete responding. The method may also be that in which load switching is performed over a time span that is longer than a frame length (anti-collision frame length) that is required for anticollision processing to prevent response collision in the communication of the RFID tag 30.

Upon receiving the output (CLK) from the oscillator 18, the load control circuit 20 changes a characteristic (load) of the antenna 12.

Figure 12:
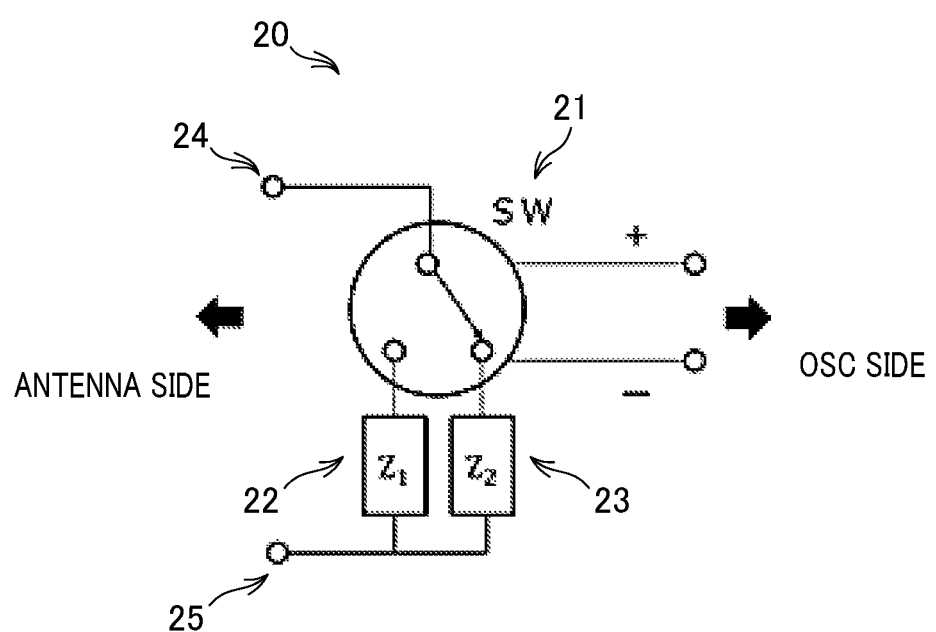
FIG. 12 is a diagram of an internal configuration of a load control circuit in the interference suppression apparatus according to the first embodiment.

FIG. 12 shows an example of an internal configuration of the load control circuit 20. In the example in FIG. 12, the load control circuit 20 is provided with a switch (SW) 21 that is capable of performing a switching operation based on the output (CLK) of the oscillator 18, and two connection paths (hereafter, a first connection path 22 and a second connection path 23) that have differing impedances (hereafter, a first impedance Z1 and a second impedance Z2), between a connection terminal 24 on a high-potential side and a connection terminal 25 on a low-potential side that are connected to the antenna 12.

Figure 4A:
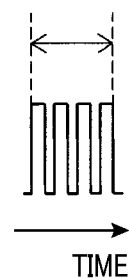
FIG. 4A is a timing chart of a communication time of the RFID tag.
Figure 4B:
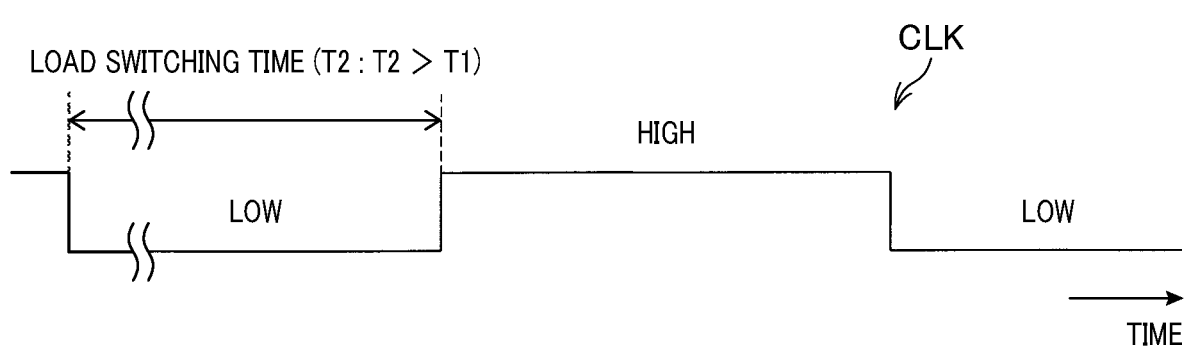
FIG. 4B is a timing chart of a load switching time of the interference suppression apparatus according to the first embodiment.

The first connection path 22 that has the first impedance Z1 connects between the connection terminal 24 on the high-potential side and the connection terminal 25 on the low-potential side, in a reception-enabled state (a state in which the antenna 12 is able to receive electric power) during ordinary operation, as a result of the switching operation of the switch 21 in response to the output (CLK) of the oscillator 18 being in the high level (see FIG. 4B). The second connection path 23 that has the second impedance Z2 connects the connection terminal 24 on the high-potential side and the connection terminal 25 on the low-potential side, in an environment-varying state (an open state, a short-circuit state, or a terminal state other than the open state and the short-circuit state) during change, as a result of the switching operation of the switch 21 in response to the output (CLK) of the oscillator 18 being in the low level (see FIG. 4B).

In the load control circuit 20 shown in FIG. 12, as a result of switching of the switch 21 being performed based on the output (CLK) of the oscillator 18, the impedance between the connection terminal 24 on the high-potential side and the connection terminal 25 on the low-potential side that are connected to the antenna 12 is changed. As a result, the characteristic (load) of the antenna 12 is changed.

FIG. 4A is a time chart of a communication time (T1) of the RFID tag 30. FIG. 4B is a time chart of a load switching time (T2) that corresponds to a period at which the characteristic of the antenna 12 of the interference suppression apparatus 10 according to the first embodiment is changed. The load switching time (T2) of the interference suppression apparatus 10 shown in FIG. 4B is set to be dimensionally longer than the communication time (T1) of the RFID tag 30 shown in FIG. 4A by a single order of magnitude or more. In FIG. 4B, the load switching time (T2) is associated with the low level of the output (CLK) of the oscillator 18. Alternately, the load switching time (T2) may be associated with the high level of the output (CLK) of the oscillator 18.

Because the power supply circuit 14 generates electric power from electromagnetic waves from the RFID reading apparatus (not shown), the interference suppression apparatus 10 according to the first embodiment can be applied to a passive-type RFID system in which power supply is not required.

Figure 2A:
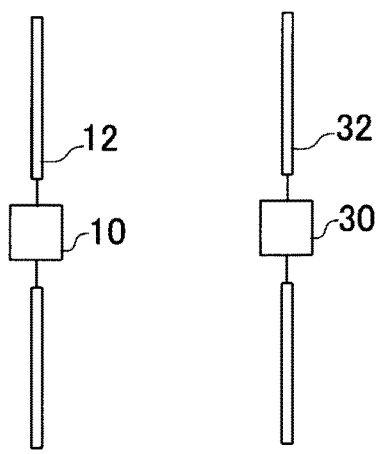
FIG. 2A is a diagram of an example of an arrangement of the RFID tag and the interference suppression apparatus according to the first embodiment.

FIG. 2A shows an example of an arrangement of the RFID tag 30 and the interference suppression apparatus 10 according to the first embodiment.

As shown in FIG. 2A, the antenna 32 of the RFID tag 30 is configured by a two-element dipole antenna. The antenna 12 of the interference suppression apparatus 10 is also configured by a two-element dipole antenna. The antenna 32 of the RFID tag 30 and the antenna 12 of the interference suppression apparatus 10 are arranged so as to be substantially parallel to each other. A gap between the antenna 32 of the RFID tag 30 and the antenna 12 of the interference suppression apparatus 10 is set to be within a single wavelength of a frequency that is used, preferably half the wavelength, and more preferably one-fourth the wavelength.

In the interference suppression apparatus 10 according to the first embodiment, the oscillator 18 sends the output (CLK) in which the time constant (τ) is adjusted to be longer than the communication time (T1) of the RFID tag 30, as described above. Upon receiving the output (CLK) from the oscillator 18, the load control circuit 20 sets a state between the two elements of the dipole antenna to an open state, a short-circuit state, or a terminal state other than the open state and the short-circuit state, thereby changing the characteristic (load) of the antenna 12.

As a result, the electromagnetic field can be effectively changed in relation to the antenna 32 of the RFID tag 30. As result of the electromagnetic field at the antenna 32 of the RFID tag 30 being changed in this manner at a longer period than the communication time (T1) of the RFID tag 30, electromagnetic field interference produced by the RFID tag 30 can be suppressed. Difficulty in reading the RFID tag 30 due to electromagnetic field interference can be resolved.

Figure 3A:
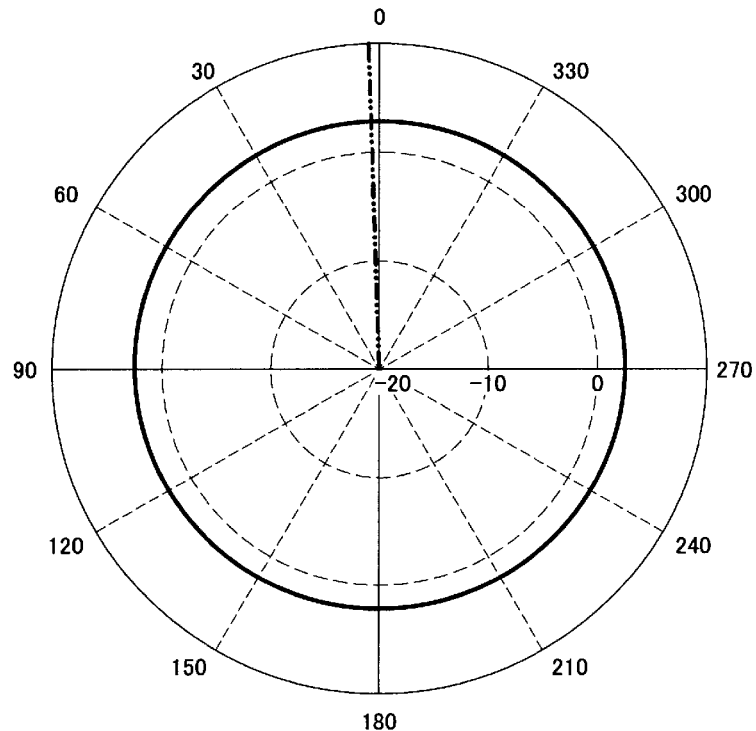
FIGS. 3A and 3B are diagrams of changes in antenna directivity in the interference suppression apparatus according to the first embodiment.
Figure 3B:
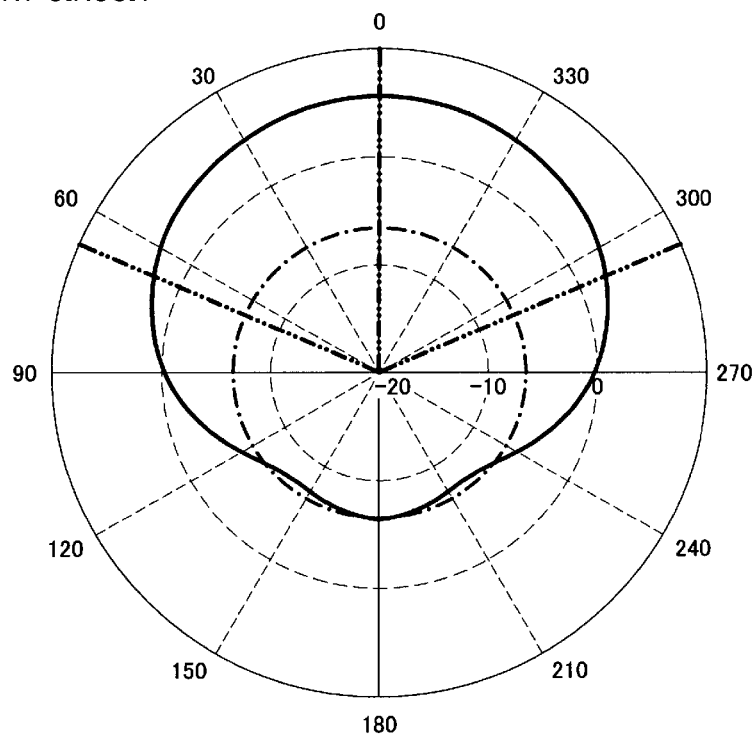

FIGS. 3A and 3B are diagrams that show changes in directivity of the interference suppression apparatus 10 according to the first embodiment that is arranged so as to be adjacent to the RFID tag 30, in a manner facing the RFID tag 30 one-on-one, as shown in FIG. 2A.

FIG. 3A shows characteristics when the state between the two elements of the dipole antenna that configures the antenna 12 of the interference suppression apparatus 10 is the open state. As shown in FIG. 3A, when the state between the two elements is the open state, an antenna directivity of the interference suppression apparatus 10 has an inherent omni-directionality of a dipole antenna. FIG. 3B shows characteristics when the state between the two elements of the dipole antenna that configure the antenna 12 of the interference suppression apparatus 10 is the short-circuit state. As shown in FIG. 3B, when the state between the two elements is the short-circuit state, the antenna directivity is biased towards a 0° direction.

Here, in this example, an electrical length of the antenna 12 of the interference suppression apparatus 10 is changed by impedance, such as a capacitance value, of the antenna 12 of the interference suppression apparatus 10 being changed by the state between the two elements of the dipole antenna being set to the open or short-circuit state. As a result, the antenna directivity is controlled by the antenna 12 of the interference suppression apparatus 10 operating as a director or a reflector in relation to the antenna 32 of the RFID tag 30. That is, in this example, the antenna directivity is controlled based on principles similar to principles of a Yagi antenna in which an unpowered parasitic element that operates as a director and an unpowered parasitic element that operates as a reflector are arrayed beside a dipole antenna.

Here, in this example, the directivity of the antenna 12 of the interference suppression apparatus 10 is controlled by the state between the two elements of the dipole antenna being set to the open state or the short-circuit state. However, instead, the antenna directivity can also be adjusted by an inductive load or a capacitive load being connected to or disconnected from the antenna 12.

In the example in FIG. 2A, the interference suppression apparatus 10 is arranged so as to be one-on-one with the RFID tag 30. Even in a case which a plurality of RFID tags 30 and a plurality of interference suppression apparatuses 10 are randomly arranged, the interference suppression apparatus 10 according to the first embodiment is capable of suppressing electromagnetic field interference produced by the RFID tag 30 and resolving difficulty in reading the RFID tag 30 due to electromagnetic field interference, by changing the electromagnetic field at a location (a multipath interference point or a null point) at which the RFID tag 30 becomes spatially difficult to read due to radio interference from a nearby electromagnetic-wave reflecting body.

In a system in which a plurality of interference suppression apparatuses 10 are used, the plurality of interference suppression apparatuses 10 change the characteristic (load) of the respective antennas 12 at differing timings, by changing the time constants (τ) of the respective oscillators 18 of the plurality of interference suppression apparatuses 10 within a predetermined range. Consequently, as a result of the plurality of interference suppression apparatuses 10 interfering with each other and changing the electromagnetic field in a complex manner, electromagnetic field interference produced by the RFID tag 30 can be suppressed and difficulty in reading the RFID tag 30 due to electromagnetic field interference can be resolved.

Figure 2B:
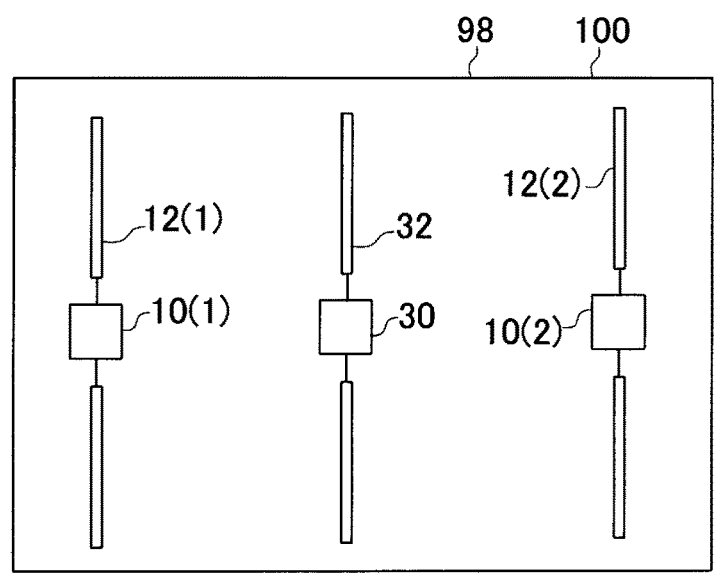
FIG. 2B is a diagram of an interference suppression apparatus of a variation example according to the first embodiment.

FIG. 2B shows an RFID tag label 100 in which a pair of first and second interference suppression apparatuses 10(1) and 10(2) is mounted in a label 98 in which the RFID tag 30 is mounted. The pair of first and second interference suppression apparatuses 10(1) and 10(2) is arranged so as to sandwich the RFID tag 30. The respective antennas 12 of the pair of first and second interference suppression apparatuses 10(1) and 10(2) and the antenna 32 of the RFID tag 30 are arranged so as to be substantially parallel to each other.

FIG. 7 shows changes in directivity in response to combinations of: ON and OFF states of the antenna element of the first interference suppression apparatus 10(1); and ON and OFF states of the antenna element of the second interference suppression apparatus 10(2), of the pair of first and second interference suppression apparatuses 10(1) and 10(2). In FIG. 7, the ON state of the antenna element is associated with the low level (see FIG. 4B) of the output (CLK) of the oscillator 18, and the OFF state of the antenna element is associated with the high level (see FIG. 4B) of the output (CLK) of the oscillator 18.

That is, the first and second interference suppression apparatuses 10(1) and 10(2) have narrow directivity when the antenna element of the first interference suppression apparatus 10(1) is in the ON state and the antenna element of the second interference suppression apparatus 10(2) is in the ON state. The first and second interference suppression apparatuses 10(1) and 10(2) have directivity when the antenna element of the first interference suppression apparatus 10(1) is ON and the antenna element of the second interference suppression apparatus 10(2) is in the OFF state. The first and second interference suppression apparatuses 10(1) and 10(2) is non-directional when the antenna element of the first interference suppression apparatus 10(1) is in the OFF state and the antenna element of the second interference suppression apparatus 10(2) is in the OFF state. The first and second interference suppression apparatuses 10(1) and 10(2) have directivity when the antenna element of the first interference suppression apparatus 10(1) is in the OFF state and the antenna element of the second interference suppression apparatus 10(2) is in the ON state.

In this manner, the directivity is changed based on the ON and OFF states of the respective antenna elements of the plurality of interference suppression apparatuses, and the plurality of interference suppression apparatuses change the characteristic of the respective antennas at differing timings. Consequently, as a result of the plurality of interference suppression apparatuses interfering with each other and changing the electromagnetic field in a complex manner, electromagnetic field interference produced by the RFID tag 30 can be suppressed, and difficulty in reading the RFID tag 30 due to electromagnetic field interference can be resolved.

Figure 5A:
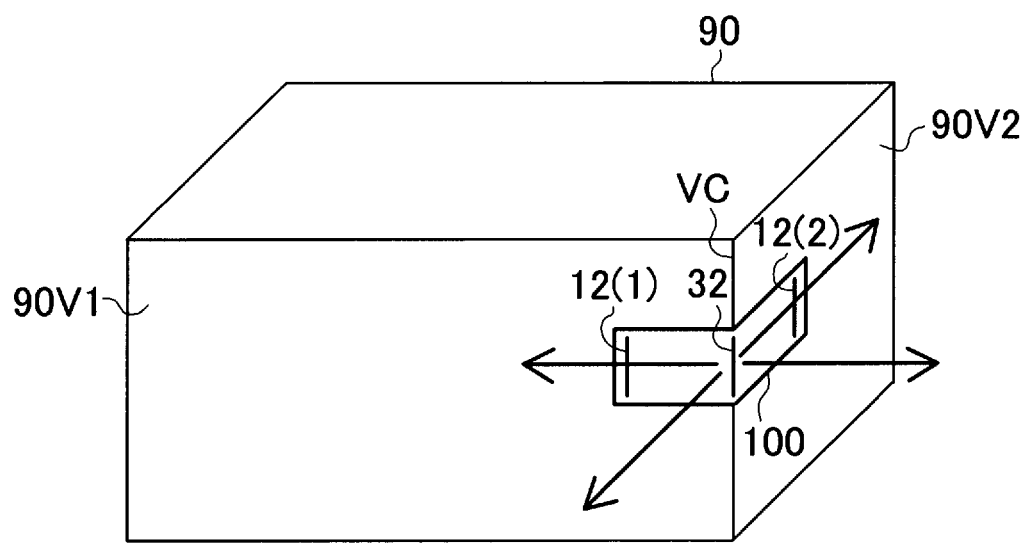
FIGS. 5A and 5B are explanatory diagrams of examples of an attachment position of the interference suppression apparatus in FIG. 2B.
Figure 5B:
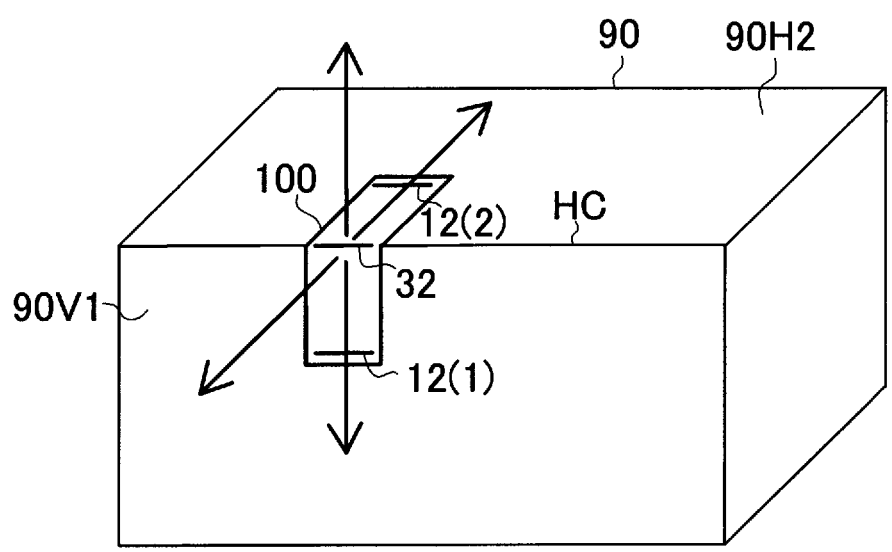

FIGS. 5A and 5B show examples in which the RFID tag label 100 in which the RFID tag 30 and the pair of first and second interference suppression apparatuses 10(1) and 10(2) are mounted as shown in FIG. 2(B) is arranged in a three-dimensional manner, and the electromagnetic field is changed in a three-dimensional manner.

In FIGS. 5A and 5B, a three-dimensional object 90 is a detection target on which the RFID tag label 100 is attached.

In the example in FIG. 5A, the RFID tag label 100 is attached to the three-dimensional object 90 such that the antenna 32 of the RFID tag 30 is positioned in a corner VC between a first surface (vertical surface) 90V1 and a second surface (vertical surface) 90V2 that form a right angle of the three-dimensional object 90, the antenna 12(1) of the first interference suppression apparatus 10(1) is positioned on the first surface 90V1, and the antenna 12(2) of the second interference suppression apparatus 10(2) is positioned on the second surface 90V2. In this example, the electromagnetic field can be changed in a horizontal direction.

In the example in FIG. 5B, the RFID tag label 100 is attached to the three-dimensional object 90 such that the antenna 32 of the RFID tag 30 is positioned in a corner HC between the first surface (vertical surface) 90V1 and a second surface (horizontal surface) 90H2 that form a right angle of the three-dimensional object 90, the antenna 12(1) of the first interference suppression apparatus 10(1) is positioned on the first surface 90V1, and the antenna 12(2) of the second interference suppression apparats 10(2) is positioned on the second surface 90H2. In this example, the electromagnetic field can be changed in a vertical direction.

In this example, the pair of first and second interference suppression apparatuses 10(1) and 10(2) is provided on the same RFID tag label 100 as the RFID tag label 100 on which the RFID tag 30 is provided. The antenna 12(1) of the first interference suppression apparatus 10(1) and the antenna 12(2) of the second interference suppression apparatus 10(2) that form a pair are arranged so as to sandwich the antenna 32 of the RFID tag 30.

In addition, in the three-dimensional object 90 on which the RFID tag label 100 is attached, the antenna 32 of the RFID tag 30 is positioned in the corner between the first surface 90V1 and the second surface 90H2 that form a right angle of the three-dimensional object 90, the antenna 12(1) of the first interference suppression apparatus 10(1) is positioned on the first surface 90V1, and the antenna 12(2) of the second interference suppression apparatus 10(2) is positioned on the second surface 90H2. Consequently, as a result of the electromagnetic field being changed in the vertical direction or the horizontal direction in relation to the antenna 32 of the RFID tag 30, electromagnetic field interference produced by the RFID tag 30 can be suppressed and difficulty in reading the RFID tag 30 due to electromagnetic field interference can be resolved.

Figure 2C:
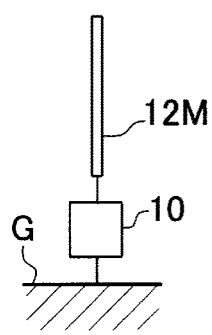
FIG. 2C is a diagram of an example of an interference suppression apparatus in which a monopole antenna is used.
Figure 2D:
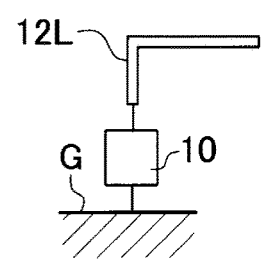
FIG. 2D is a diagram of an example of an interference suppression apparatus in which an L-shaped antenna is used.

FIG. 2C shows an example of the interference suppression apparatus 10 in which a monopole antenna 12M is used. FIG. 2D shows an example of the interference suppression apparatus 10 in which an L-shaped antenna 12L is used.

The interference suppression apparatuses 10 shown in FIGS. 2C and 2D are each attached to a grounding surface G such as a metal plate. Of two antenna terminals of the interference suppression apparatus 10, one antenna terminal is connected to the grounding surface G and the other antenna terminal is connected to the monopole antenna 12M (FIG. 2C) or the L-shaped antenna 12L (FIG. 2D). The interference suppression apparatus 10 repeatedly turns the two antenna terminals to be in ON and OFF states at a timing that is set.

In the examples shown in FIGS. 2C and 2D, the antenna is configured by a single element 12M or 12L and the grounding surface G. The load control circuit 20 shown in FIG. 1B changes the characteristic of the antenna by setting a state between the single element 12M or 12L and the grounding surface G to an open state, a short-circuit state, or a terminal state other than the open state and the short-circuit state. As a result, even when the RFID tag is attached to metal, as a result of the metal surface serving as the grounding surface G, the electromagnetic field can be effectively changed in relation to the antenna of the RFID tag.

FIG. 6 is a flowchart of operations of the interference suppression apparatus 10 according to the first embodiment.

First, when a transmission signal (carrier signal) is transmitted from the RFID reading apparatus (not shown), the interference suppression apparatus 10 receives the transmission signal (S12). The power supply circuit 14 shown in FIG. 1A rectifies and smooths the transmission signal, and generates the operation power supply. The power supply circuit 14 stores the operation power supply in the capacitor 16 as electrical charge.

Next, upon receiving the power supply voltage supplied from the capacitor 16, the oscillator 18 sends output thereof at a period that is set as shown in FIG. 4B. The load control circuit 20 receives the output from the oscillator 18 and performs load state control in which the characteristic of the antenna 12 is changed (S14).

Figure 8A:
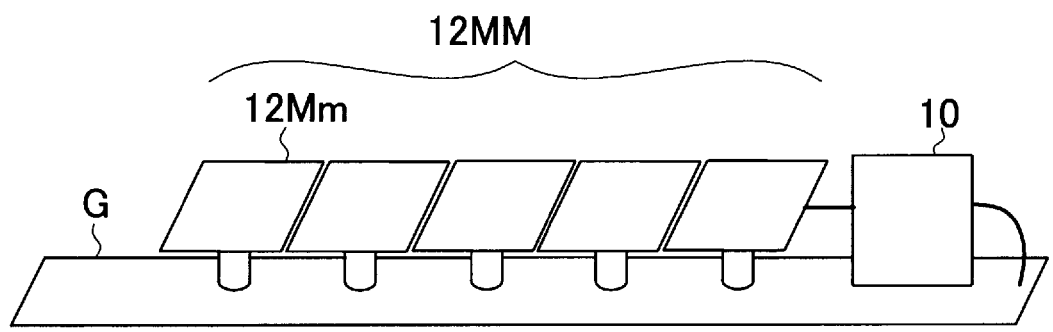
FIGS. 8A and 8B are explanatory diagrams of an interference suppression apparatus of another example according to the first embodiment.
Figure 8B:
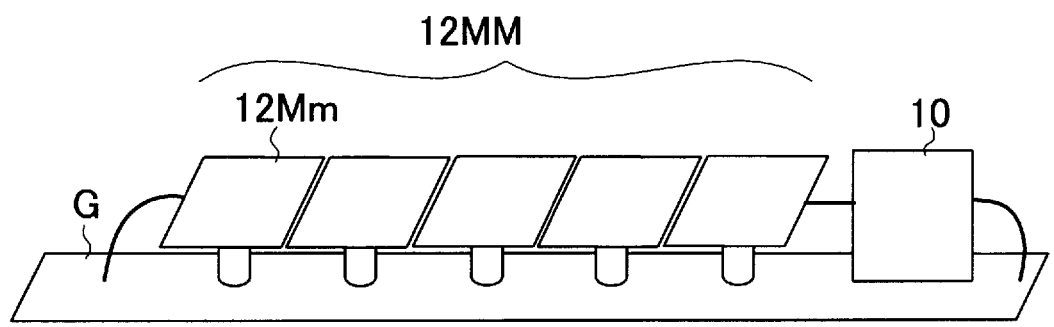

FIGS. 8A and 8B are explanatory diagrams of the interference suppression apparatus according to another example according to the first embodiment.

In the other example according to the first embodiment, the antenna is composed of a mushroom structure 12MM that is composed of an array of a plurality of mushroom-like elements 12Mm. The mushroom structure 12MM configures a resonator. Resonance changes between series resonance and parallel resonance as a result of a state of the resonator being switched to an open state as shown in FIG. 8A or a short-circuit state as shown in FIG. 8B. As a result, behavior of the resonator as an electrical wall, an electromagnetic wall, or an Electromagnetic Band Gap (EBG) structure can be changed, and characteristics that act on electromagnetic field distribution in space can be controlled. Here, as the resonator, in addition to the mushroom structure, a Composite Right/Left-Hand (CRLH) line can also be used.

In the other example according to the first embodiment, the antenna is composed of a resonator. The load control circuit 20 shown in FIG. 1B changes the behavior of the resonator as an electrical wall, an electromagnetic wall, or an EBG structure. Consequently, as a result of the electromagnetic field being effectively changed in relation to the antenna 32 of the RFID tag 30, electromagnetic field interference produced by the RFID tag 30 can be suppressed and difficulty in reading the RFID tag 30 due to electromagnetic field interference can be resolved.

Second Embodiment

Next, an interference suppression apparatus according to a second embodiment will be described with reference to the drawings.

Figure 9A:
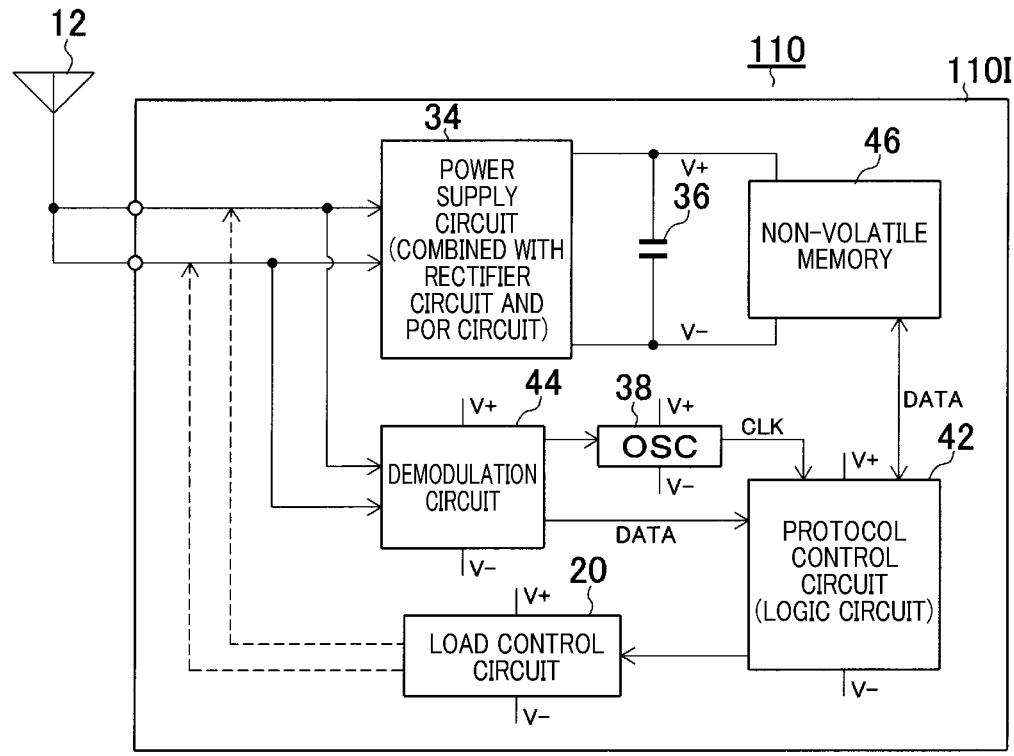
FIG. 9A is a circuit diagram of an interference suppression apparatus IC that configures an interference suppression apparatus according to a second embodiment.

FIG. 9A shows an electrical configuration of the interference suppression apparatus IC 10I that configures an interference suppression apparatus 110 according to the second embodiment.

The interference suppression apparatus IC 10I is configured by the power supply circuit 34, the demodulation circuit 44, the protocol control circuit 42, the non-volatile memory 46, the load control circuit 20, the capacitor 36, the oscillator 38, and the like.

For example, the power supply circuit 34 may be configured by a power supply circuit that is combined with a rectifier circuit and a POR circuit. The power supply circuit 34 rectifies and smooths a transmission signal (carrier signal) from the RFID reading apparatus that is received through the antenna 12, and generates an operation power supply. The power supply circuit 34 stores the operation power supply in the capacitor 36 as electric charge. The power supply circuit 34 supplies each constituent element of the interference suppression apparatus IC 10I including the protocol control circuit 42 with the electric charge that is stored in the capacitor 36, the electric charge serving as a power supply voltage.

In addition, the demodulation circuit 44 demodulates data (DATA) that is superimposed on the transmission signal (carrier signal) and outputs the demodulated data to the protocol control circuit 42. The non-volatile memory 46 stores therein a control program and the like.

For example, the protocol control circuit 42 is configured by a logic circuit. The protocol control circuit 42 reads the above-described pieces of information and data (DATA) from the non-volatile memory 46, and identifies a command that is transmitted from the RFID reading apparatus. When a command that is set in advance is detected, the protocol control circuit 42 sends output to the load control circuit 20 and makes the load control circuit 20 change the load of the antenna 12. Here, the antenna 12 is composed of a two-element dipole antenna. Each time the command is detected, the state between the two elements is switched to an open state, a short-circuit state, or a terminal state other than the open state and the short-circuit state.

Figure 11:
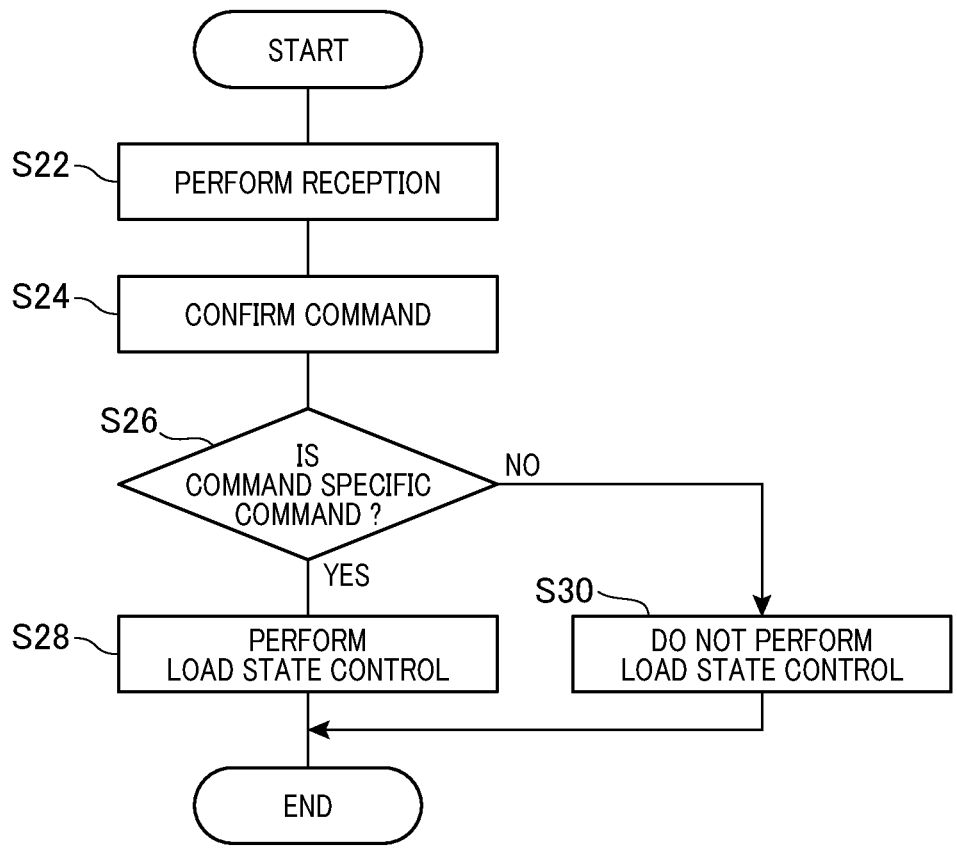
FIG. 11 is a flowchart of operations of the interference suppression apparatus according to the second embodiment.

FIG. 11 is a flowchart of operations of the interference suppression apparatus according to the second embodiment.

When the protocol control circuit 42 that corresponds to a command detector of the present disclosure receives the transmission signal that is transmitted from the RFID reading apparatus (not shown) (S22), the protocol control circuit 42 confirms the command from the received transmission signal from the RFID reading apparatus (S24). In addition, the protocol control circuit 42 determines whether the command is a specific command, such as a command from the RFID reading apparatus that is used when a response is not received as a result of a communication error or a collision (S26).

As a result of the determination, when determined that the specific command is transmitted (YES at S26), the protocol control circuit 42 controls a load state of the antenna 12 by the load control circuit 20 (S28). Specifically, as described above, the load control circuit 20 switches the state between the two elements that configure the dipole antenna to an open state, a short-circuit state, or a terminal state other than the open state and the short-circuit state. Meanwhile, unless the specific command is transmitted (No at S26), the protocol control circuit 42 does not perform control of the load state of the antenna 12 by the load control circuit 20 (S30).

Figure 10:
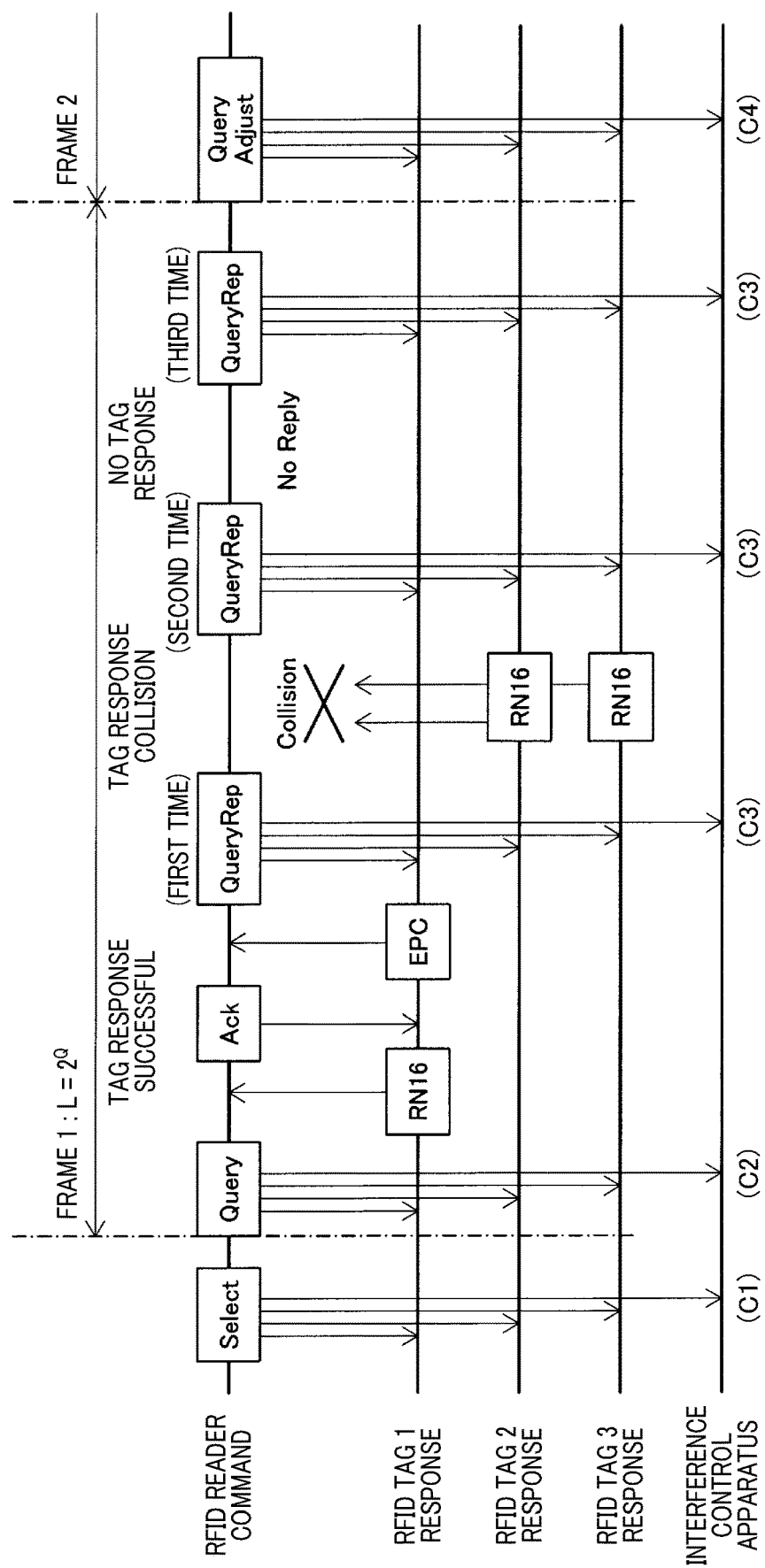
FIG. 10 is a diagram of a communication sequence of the interference suppression apparatus according to the second embodiment.

FIG. 10 is a diagram of a communication sequence between the RFID reading apparatus (RFID reader) and the interference suppression apparatus according to the second embodiment. In the example in FIG. 10, communication between the RFID reading apparatus and the RFID tag is performed based on to a predetermined communication protocol, such as the Electronic Product Code (EPC) Ultra-high-frequency (UHF) Generation 2 (Gen2) Air Interface Protocol according to the present embodiment. Here, the communication protocol is not limited to the EPC UHF Gen2 Air Interface Protocol. A communication protocol based on any standard other than the EPC UHF Gen2 Air Interface Protocol can also be applied as long as the communication protocol enables communication between the RFID reading apparatus and the RFID tag.

The RFID reading apparatus changes a transmission command based on response content and state, and sends the transmission command to the RFID tag side. The RFID tag transmits, to the RFID reading apparatus side, a response that differs based on content of the command and a state of the RFID tag when the command is received. In the example in FIG. 10, three RFID tags (hereafter, an RFID tag 1, an RFID tag 2, and an RFID tag 3) respond to a single RFID reading apparatus. When the RFID reading apparatus sends a specific command, the interference suppression apparatus changes the characteristic of the antenna.

First, when the RFID reading apparatus transmits a command [Select], the interference suppression apparatus changes the characteristic of the antenna in response to the command [Select] (C1). The command [Select] is a command to start reading, and designates a flag of an RFID tag and a session parameter. As a result, sessions are switched at a high speed. When a same RFID tag is to be continuously read, a reading rate of the RFID tag can be efficiently improved.

Next, when the RFID reading apparatus sends a command [Query] the interference suppression apparatus changes the characteristic of the antenna in response to the command [Query] (C2). The command [Query] is a command to start a first frame (initial reading period), and sets a slot counter and sets a response permission state (Arbitrate) or a response state (Reply) based on the state of the RFID tag. As a result, the reading rate of the RFID tag can be efficiently improved by the surrounding electromagnetic field being changed per inventory during a single reading period.

In response to the command [Query], the RFID tag 1 sends a response [RN16] to the RFID reading apparatus side. The response [RN16] gives notification of reception. The RFID reading apparatus sends a command [Ack] to the RFID tag 1. The command [Ack] gives notification of success of a response from an RFID tag. In response to the command [Ack], the RFID tag 1 sends a response [EPC]. The RFID tag (the RFID tag 1, in this case) that as has successfully responded inverts an inventory flag so as not to respond until the start of a next period.

Here, each time the RFID reading apparatus sends a command [QueryRep], the RFID tag decreases the slot counter. When the command [Query], [QueryRep], or [QueryAdjust] is received, the RFID tag responds by sending the response [RN16] when a value that is outputted by the slot counter of the RFID tag is 0. When the RFID reading apparatus transmits the command [QueryAdjust], the RFID tag resets the slot counter.

Next, when the RFID reading apparatus transmits the command [QueryRep], the interference suppression apparatus changes the characteristic of the antenna in response to the command [QueryRep] (C3). The command [QueryRep] advances a slot within a frame, decreases the slot counter, and prompts a response. As a result, a prevention rate for response collision can be increased and reading speed can be improved by the load state of the antenna being changed at all times during a reading frame.

In response to the command [QueryRep] from the RFID reading apparatus, the RFID tag 2 and the RFID tag 3 send the response [RN16] that gives notification of reception to the RFID reading apparatus side. However, the responses from the RFID tags 2 and 3 are not successful due to response collision. When responses by the response [RN16] collide, the responses fail. The command [QueryRep] is transmitted again from the RFID reading apparatus side. The RFID tag that has failed in responding cannot respond until the start of the next frame, that is, until the command [QueryAdjust] or [Query] is received.

Next, the RFID reading apparatus sends a second command [QueryRep] during frame 1. However, no response is received from the RFID tags. The interference suppression apparatus changes the characteristic of the antenna in response to the command [QueryRep] (C3).

Next, the RFID reading apparatus sends a third command [QueryRep] during frame 1. In response to the command [QueryRep], the interference suppression apparatus changes the characteristic of the antenna in response to the command [QueryRep] (C3).

Next, when, with the start of frame 2, the RFID reading apparatus sends the command [QueryAdjust], the interference suppression apparatus changes the characteristic of the antenna in response to the command [QueryAdjust] (C4). The command [QueryAdjust] resets the slot counter of the RFID tag (starts a new frame) and prompts a response. As a result, a reading environment within a single frame can be preserved. In addition, the reading rate of the RFID tag can be improved with minimal likelihood of reading of an RFID tag in which a communication path is ensured being obstructed.

In the interference suppression apparatus according to the second embodiment, the load suppression circuit 20 changes the characteristic of the antenna 12 based on the detection of a specific command by the command detector (protocol control circuit) 42 that detects a specific command (such as a command for responding to a collision) that is transmitted from the RFID reading apparatus. Consequently, as a result of the electromagnetic field at the antenna of the RFID tag being changed by the load control circuit 20 changing the characteristic of the antenna 12 at a timing at which a specific command is outputted, electromagnetic field interference produced by the RFID tag can be suppressed and difficulty in reading the RFID tag due to electromagnetic field interference can be resolved.

In the interference suppression apparatus according to the second embodiment, the state of the interference suppression apparatus is changed by the transmission command for reading the RFID tag on the RFID reading apparatus side. As a result, load control of the antenna and changes in the surrounding electromagnetic field can be performed at an appropriate timing. A number of RFID tags that are read can be efficiently increased.

Variation Examples According to the Second Embodiment

Figure 9B:
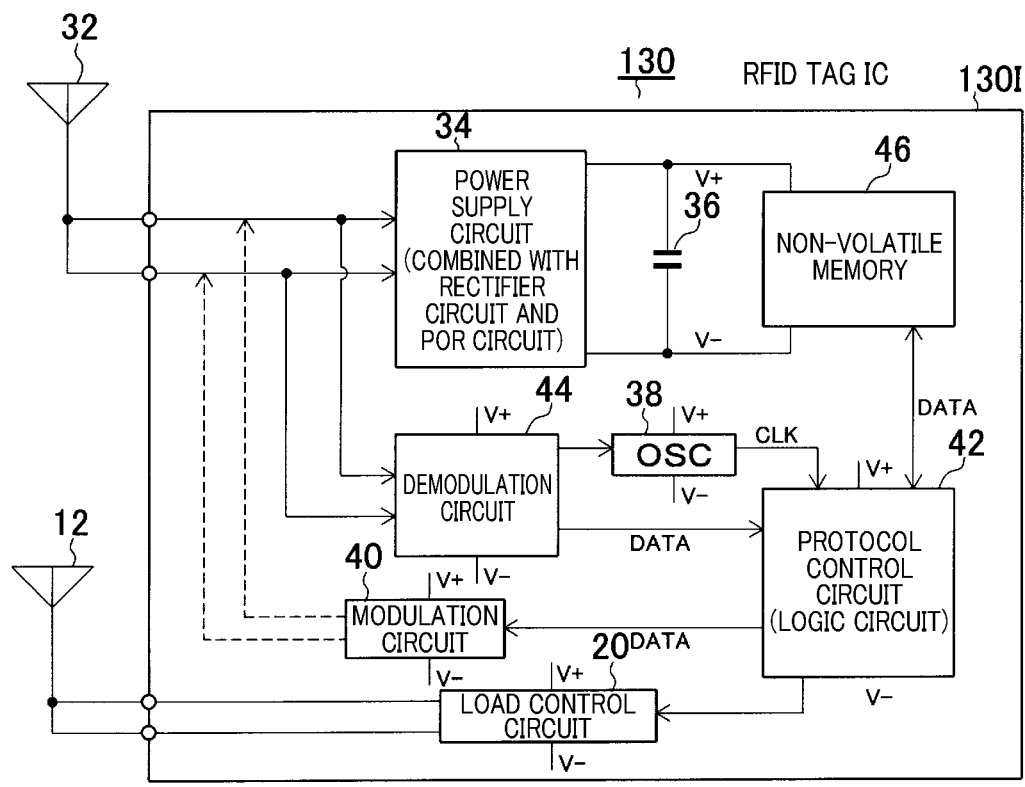
FIG. 9B is a circuit diagram of an interference suppression apparatus IC that configures the interference suppression apparatus of a variation example according to the second embodiment.

FIG. 9B is a circuit diagram of an interference suppression apparatus IC of a variation example according to the second embodiment. An interference suppression apparatus 130 of the present variation example provides the function of the interference suppression apparatus inside an RFID tag IC 1301. The RFID tag IC 1301 is configured by the antenna 32, the power supply circuit 34, the demodulation circuit 44, the protocol control circuit 42, the non-volatile memory 46, the modulation circuit 40, the capacitor 36, the oscillator 38, and the like.

As a result, the interference suppression apparatus 130 functions as an RFID tag. Furthermore, the interference suppression apparatus 130 includes the interference suppression antenna 12 and the load control circuit 20. In a manner similar to the interference suppression apparatus 110 according to the second embodiment, the interference suppression apparatus 130 sets the state between the two elements of the interference suppression antenna (dipole antenna) 12 to an open state, a short-circuit state, or a terminal state other than the open state and the short-circuit state, based on reception of a command that is set.

In the interference suppression apparatus of the present variation example, the interference suppression apparatus is mounted in the RFID tag. Consequently, as a result of the electromagnetic field being effectively changed in relation to the antenna of the RFID tag, electromagnetic field interference produced by the RFID tag can be suppressed and difficulty in reading the RFID tag due to electromagnetic field interference can be resolved.

Here, in a method (hereafter, a first method) in which gain is increased through use of a Yagi antenna or a parabola antenna, or a method (hereafter, a second method) in which a communication path is extended through use of a relay, installation is performed to accommodate an environment of each site. Replanning is required when layout is changed, and a survey of electromagnetic fields is required for implementation.

In contrast, the interference suppression apparatuses according to the first embodiment and the second embodiment (hereafter, the present embodiment) secure a communication path by changing a spatial null position in a communication environment. Therefore, all that is needed is for the interference suppression apparatus to be attached. Consequently, in addition to implementation being facilitated, the interference suppression apparatus has tolerance to change in that adjustments are not required even when the layout is changed.

In addition, from a perspective of a degree of freedom in arrangement, in the first method, the degree of freedom differs based on effects of the environment depending on a location within half a wavelength from a fixed RFID tag to meet the required gain. In addition, in the second method, the relay is required to be arranged between the RFID reading apparatus and the RFID tag. In contrast, in the interference suppression apparatus according to the present embodiment, although the interference suppression apparatus is preferably arranged near the RFID tag, because the load state of the antenna is variable, the degree of freedom regarding installation location is high.

In addition, from a perspective of effects on other RFID tags, in the first method, the antenna becomes an obstacle for an RFID tag that is hidden from radio waves by the antenna. In addition, in the second method, the effects are only obtained regarding a target RFID tag. In contrast, in the interference suppression apparatus according to the present embodiment, whether other RFID tags are affected can be changed by switching.

Furthermore, from a perspective of robustness, in the first method and the second method, resetting is required when the layout is changed. In contrast, in the interference suppression apparatus according to the present embodiment, because a goal is to change the null position, the interference suppression apparatus has tolerance to change in that adjustments are not required even when the layout is changed.

Moreover, from a perspective of compatibility with existing sites, in the first method, alignment is required to be performed for each RFID tag. In addition, in the second method, an installation location for the relay is required to be secured. In contrast, in the interference suppression apparatus according to the present embodiment, the interference suppression apparatus is merely required to be attached, and therefore, implementation is facilitated.

What is claimed is:

1. An interference suppression apparatus that suppresses electromagnetic field interference produced by a radio frequency identification tag, the interference suppression apparatus comprising:
a power supply circuit;
an antenna that is connected to the power supply circuit;
a clock that is connected to the power supply circuit and generates an output in which a time constant is adjusted to be longer than a communication time of the radio frequency identification tag; and
a load adjuster that is connected to the power supply circuit and changes a characteristic of the antenna based on the output from the clock, wherein:
the radio frequency identification tag is provided on a label;
the interference suppression apparatus is provided on the same label as the radio frequency identification tag; and
the antenna of the interference suppression apparatus and an antenna of the radio frequency identification tag are arranged so as to be substantially parallel to each other with a predetermined gap therebetween.

2. An interference suppression apparatus that suppresses electromagnetic field interference produced by a radio frequency identification tag, the interference suppression apparatus comprising:
a power supply circuit;
an antenna that is connected to the power supply circuit;
a command detector that is connected to the power supply circuit and detects a specific command that is transmitted from a radio frequency identification reading apparatus for radio frequency identification tags; and
a load adjuster that is connected to the power supply circuit and changes a characteristic of the antenna based on the specific command detected by the command detector, wherein:
the radio frequency identification tag is provided on a label;
the interference suppression apparatus is provided on the same label as the radio frequency identification tag; and
the antenna of the interference suppression apparatus and an antenna of the radio frequency identification tag are arranged so as to be substantially parallel to each other with a predetermined gap therebetween.

3. An interference suppression apparatus that suppresses electromagnetic field interference produced by a radio frequency identification tag, the interference suppression apparatus comprising:
a power supply circuit;
an antenna that is connected to the power supply circuit;
a clock that is connected to the power supply circuit and generates an output in which a time constant is adjusted to be longer than a communication time of the radio frequency identification tag; and
a load adjuster that is connected to the power supply circuit and changes a characteristic of the antenna based on the output from the clock, wherein:
the antenna is configured by a dipole antenna that includes two elements; and
the load adjuster is configured to change the characteristic of the antenna by setting a state provided between the two elements to an open state, a short-circuit state, or a terminal state which is other than the open state and the short-circuit state.

4. An interference suppression apparatus that suppresses electromagnetic field interference produced by a radio frequency identification tag, the interference suppression apparatus comprising:
a power supply circuit;
an antenna that is connected to the power supply circuit;
a clock that is connected to the power supply circuit and generates an output in which a time constant is adjusted to be longer than a communication time of the radio frequency identification tag; and
a load adjuster that is connected to the power supply circuit and changes a characteristic of the antenna based on the output from the clock, wherein:
the antenna has a single element and a grounding surface; and
the load adjuster is configured to change the characteristic of the antenna by setting a state provided between the single element and the grounding surface to an open state, a short-circuit state, or a terminal state other than the open state and the short-circuit state.

5. An interference suppression apparatus that suppresses electromagnetic field interference produced by a radio frequency identification tag, the interference suppression apparatus comprising:
a power supply circuit;
an antenna that is connected to the power supply circuit;
a clock that is connected to the power supply circuit and generates an output in which a time constant is adjusted to be longer than a communication time of the radio frequency identification tag; and
a load adjuster that is connected to the power supply circuit and changes a characteristic of the antenna based on the output from the clock, wherein:
the antenna is configured by a resonator; and
the load adjuster is configured to change the characteristic of the antenna by changing behavior of the resonator as an electrical wall, an electromagnetic wall, or an electromagnetic band gap structure.

6. An interference suppression apparatus that suppresses electromagnetic field interference produced by a radio frequency identification tag, the interference suppression apparatus comprising:
a power supply circuit;
an antenna that is connected to the power supply circuit;
a command detector that is connected to the power supply circuit and detects a specific command that is transmitted from a radio frequency identification reading apparatus for radio frequency identification tags; and
a load adjuster that is connected to the power supply circuit and is configured to change a characteristic of the antenna based on the specific command detected by the command detector, wherein:
the antenna is configured by a dipole antenna that includes two elements; and
the load adjuster is configured to change the characteristic of the antenna by setting a state provided between provided the two elements to an open state, a short-circuit state, or a terminal state which is other than the open state and the short-circuit state.

7. An interference suppression apparatus that suppresses electromagnetic field interference produced by a radio frequency identification tag, the interference suppression apparatus comprising:
a power supply circuit;
an antenna that is connected to the power supply circuit;
a command detector that is connected to the power supply circuit and detects a specific command that is transmitted from a radio frequency identification reading apparatus for radio frequency identification tags; and
a load adjuster that is connected to the power supply circuit and is configured to change a characteristic of the antenna based on the specific command detected by the command detector, wherein:
the antenna has a single element and a grounding surface; and
the load adjuster is configured to change the characteristic of the antenna by setting a state provided between the single element and the grounding surface to an open state, a short-circuit state, or a terminal state other than the open state and the short-circuit state.

8. An interference suppression apparatus that suppresses electromagnetic field interference produced by a radio frequency identification tag, the interference suppression apparatus comprising:
a power supply circuit;
an antenna that is connected to the power supply circuit;
a command detector that is connected to the power supply circuit and detects a specific command that is transmitted from a radio frequency identification reading apparatus for radio frequency identification tags; and
a load adjuster that is connected to the power supply circuit and is configured to change a characteristic of the antenna based on the specific command detected by the command detector, wherein:
the antenna is configured by a resonator; and
the load adjuster is configured to change the characteristic of the antenna by changing behavior of the resonator as an electrical wall, an electromagnetic wall, or an electromagnetic band gap structure.

* * * * *